US012675127B2

(12) United States Patent
Ninomiya

(10) Patent No.: US 12,675,127 B2
(45) Date of Patent: Jul. 7, 2026

(54) INPUT DEVICE HAVING MAGNETIC SENSOR

(71) Applicant: Alps Alpine Co., Ltd., Tokyo (JP)

(72) Inventor: Nobuyuki Ninomiya, Miyagi-ken (JP)

(73) Assignee: Alps Alpine Co., Ltd. (JP)

(*) Notice: Subject to any disclaimer, the term of this patent is extended or adjusted under 35 U.S.C. 154(b) by 0 days.

(21) Appl. No.: 18/826,413

(22) Filed: Sep. 6, 2024

(65) Prior Publication Data

US 2025/0103086 A1 Mar. 27, 2025

(30) Foreign Application Priority Data

Sep. 22, 2023 (JP) ................................ 2023-158267

(51) Int. Cl.
*G05G 9/047* (2006.01)

(52) U.S. Cl.
CPC ... *G05G 9/047* (2013.01); *G05G 2009/04755* (2013.01)

(58) Field of Classification Search
CPC ..................... G05G 9/047; G05G 2009/04755
See application file for complete search history.

(56) References Cited

U.S. PATENT DOCUMENTS 5,504,502 A * 4/1996 Arita ..................... G06F 1/1616 345/905
5,831,596 A * 11/1998 Marshall ................ G01D 5/145 345/161
2022/0342438 A1* 10/2022 Yu ........................... A63F 13/24

FOREIGN PATENT DOCUMENTS

JP 2002-181588 A 6/2002
JP 2022-166831 A 11/2022

* cited by examiner

*Primary Examiner* — Minnah L Seoh
*Assistant Examiner* — Gregory T Prather
(74) *Attorney, Agent, or Firm* — Harness, Dickey & Pierce, P.L.C.

(57) ABSTRACT

An input device includes a fixing member, a rotatable movable member supported by the fixing member rotatably about a first direction as a center of rotation, an annular magnetic member comprising a body, a first extended portion, and a second extended portion, and having a divided space formed between the first extended portion and the second extended portion facing along a second direction orthogonal to the first direction, the annular magnetic member being configured to generate a magnetic field, and a magnetic sensor attached to the fixing member and being attached to the rotatable movable member, the magnetic sensor being configured to detect the direction of a magnetic field to detect a rotation of the rotatable movable member, in which the body extends in a third direction orthogonal to the first direction and the second direction.

3 Claims, 9 Drawing Sheets

INPUT DEVICE HAVING MAGNETIC SENSOR

CLAIM OF PRIORITY

This application claims benefit of Japanese Patent Application No. 2023-158267 filed on Sep. 22, 2023, which is hereby incorporated by reference in its entirety.

BACKGROUND OF THE INVENTION

1. Field of the Invention

The present invention relates to an input device including a magnetic sensor.

2. Description of the Related Art

Japanese Unexamined Patent Application Publication No. 2022-166831 discloses a Hall joystick structure that enables easy layout, reduced power consumption, easy detection calculation, and lower cost. This Hall joystick structure includes a reset spring, an interlock member, a first housing, a second housing, a joystick, and a stick holder. The reset spring is provided to the stick holder, the first housing is fixed to a first side wall of the stick holder, the second housing is fixed to a second side wall of the stick holder, the first side wall is perpendicular to the second side wall, and the joystick is configured to drive the motion of the interlock member by rotating inside the stick holder with a contact point of the stick holder as the center of rotation. To the first housing, a first rotating disk is provided and to the second housing, a second rotating disk is provided. The interlock member is configured to drive the first disk to rotate inside the first housing, and the interlock member is configured to drive the second disk to rotate inside the second housing. Each of the first rotating disk and the second rotating disk comprises therein a magnet. A first Hall element is provided in the first housing and a second Hall element is provided in the second housing.

Japanese Unexamined Patent Application Publication No. 2002-181588 discloses a compact magnetic encoder that can be manufactured easily and provide a high detection accuracy. This magnetic encoder includes a magnetic field generation unit configured to generate a vertical and uniform magnetic field to a rotary shaft that rotates integrally with a body to be detected, magnetic field detecting units each having a directivity and a polarity with respect to the direction of the magnetic field, at least one of the units is provided in the magnetic field generated by the magnetic field generation unit such that the directivity is maximized in a direction perpendicular to the rotating shaft, and at least one of the units is provided at a position rotated about the rotary shaft, and a waveform processing circuit configured to convert signals obtained from the magnetic field detecting unit into angle information and position information.

Japanese Unexamined Patent Application Publication No. 2022-166831 discloses the structure including a magnetic sensor for detecting the intensity of a magnetic field; however, this structure is susceptible to the influence of a disturbance magnetic field. Japanese Unexamined Patent Application Publication No. 2002-181588 discloses the encoder including a magnetic sensor for detecting the direction of a magnetic field, and this encoder is less susceptible to the influence of a disturbance magnetic field. However, a magnetic member including a permanent magnet and a yoke extends in the rotational axis direction, and thus the size of the device in the rotational axis direction is large.

SUMMARY OF THE INVENTION

The present invention is directed to provide a compact input device that includes a magnetic member disposed in the vicinity of a magnetic sensor, the magnetic member being configured to change the direction of a magnetic field.

According to an aspect of the invention, there is provided an input device including a fixing member, a rotatable movable member supported by the fixing member rotatably about a first direction as a center of rotation; an annular magnetic member comprising a body, a first extended portion extended from one end of the body, and a second extended portion extended from the other end of the body, and having a divided space formed between a first tip portion of the first extended portion and a second tip portion of the second extended portion facing along a second direction orthogonal to the first direction, the annular magnetic member being configured to generate a magnetic field going from the first extended portion toward the second extended portion and being attached to the rotatable movable member, and a magnetic sensor attached to the fixing member, the magnetic sensor being configured to detect the direction of the magnetic field emitted from one of the first extended portion and the second extended portion toward the other portion to detect a rotation of the rotatable movable member. The body extends in a third direction orthogonal to the first direction and the second direction.

With this structure, the body of the annular magnetic member extends in a direction different from the rotational axis direction of the rotatable movable member, thereby reducing the size of the device in the rotational axis direction.

In this input device, the device may further include a control stick supported by the fixing member together with the rotatable movable member rotatably about the first direction as the center of rotation. The annular magnetic member may be disposed at a position away from the control stick in the first direction, the annular magnetic member may comprise a permanent magnet, a first yoke having the first tip portion and a first base portion connected to one pole of the permanent magnet and a second yoke having the second tip portion and a second base portion connected to the other pole of the permanent magnet, the first yoke may have a first middle portion extending along a surface parallel to the second direction and the third direction and a first bent piece bent from the first middle portion along the first direction toward the control stick, the second yoke may have a second middle portion extending along the surface parallel to the second direction and the third direction and a second bent piece bent from the second middle portion along the first direction toward the control stick, and one pole of the permanent magnet may be connected to the first bent piece and the other pole is connected to the second bent piece such that the first bent piece and the second bent piece are disposed at positions closer to the control stick than the first middle portion and the second middle portion are.

With this structure, the permanent magnet can be disposed on the side closer to the control stick, and thus the size of the device in the rotational axis direction can be further reduced.

In this input device, the rotatable movable member may comprise a rotary shaft member and a rotating disk configured to rotate in conjunction with the rotary shaft member, the fixing member may comprise a housing rotatably supporting the rotary shaft member and a sensing block attached to the housing and rotatably supporting the rotating disk, and to the sensing block the magnetic sensor is attached, and the rotating disk may be a nonmagnetic cylindrical component to which the annular magnetic member is attached and rotatably inserted into a cylindrical recessed portion formed in the sensing block. With this structure, the magnetic sensor can be attached to the sensing block and the rotating disk is rotatably supported by the sensing block. Accordingly, by attaching the sensing block to the housing, the magnetic sensor and the rotating disk can be assembled in a space-saving manner.

DESCRIPTION OF THE PREFERRED EMBODIMENTS

Figure 1:
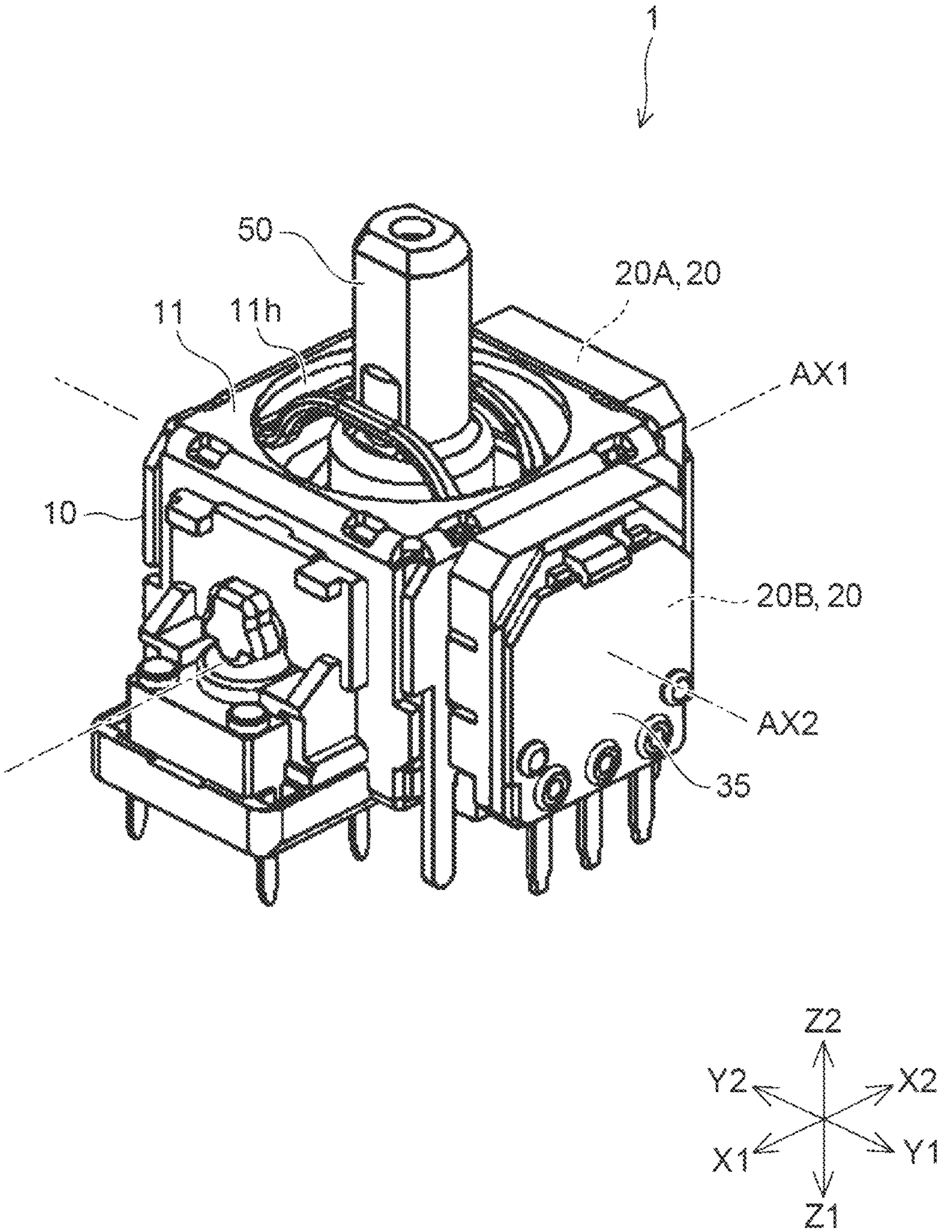
FIG. 1 is an external perspective view illustrating an input device according to an embodiment.

Hereinafter, an embodiment of the invention will be described in detail with reference to the attached drawings. In the following descriptions, the same reference numerals are given to the same components and descriptions of the components described once will be omitted as appropriate.

Input Device

Figure 2:
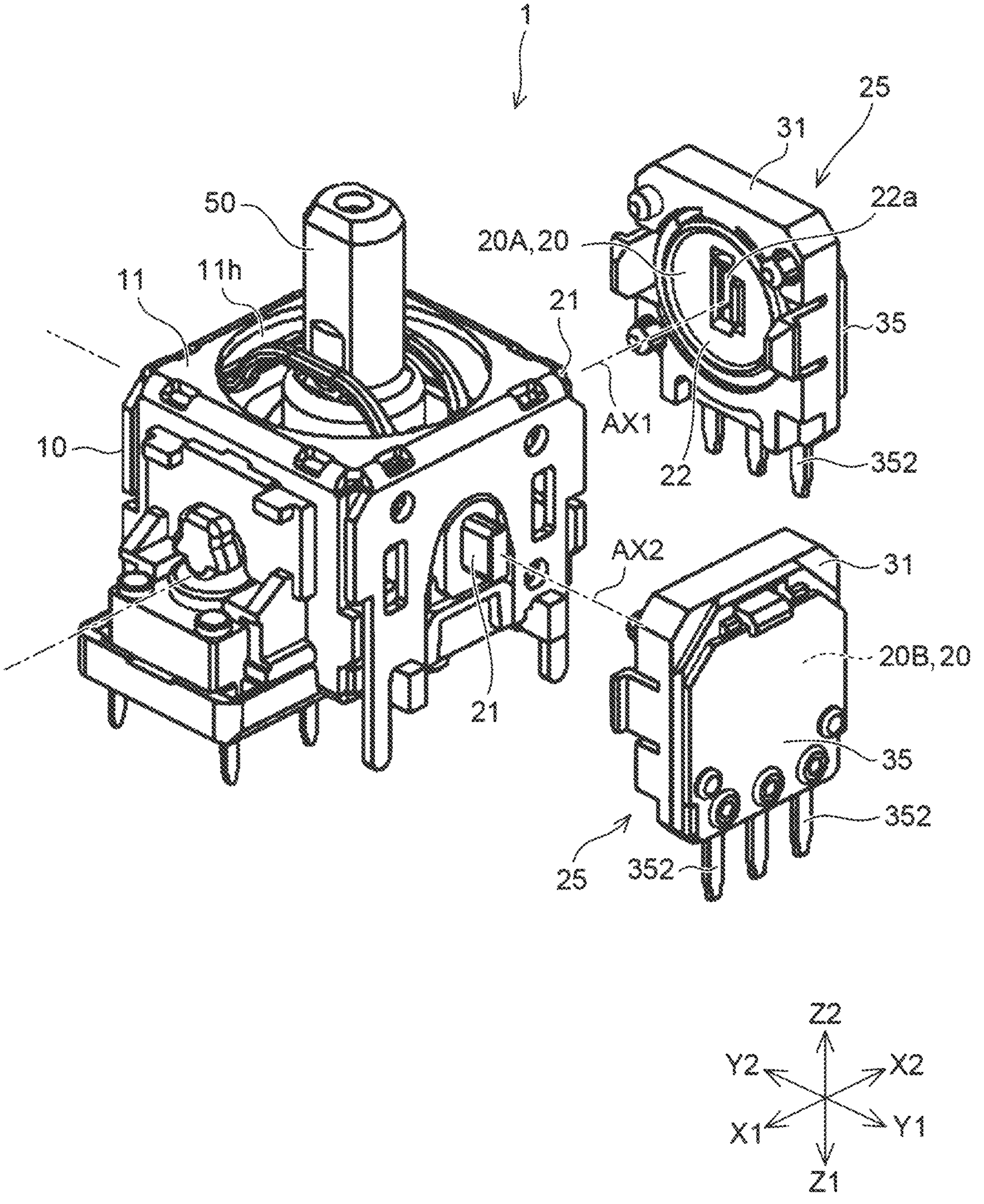
FIG. 2 is a partly exploded perspective view illustrating an input device according an embodiment.

FIG. 1 is an external perspective view illustrating an input device according to the embodiment. FIG. 2 is a partly exploded perspective view illustrating an input device according the embodiment. An input device 1 according to the embodiment is a device configured to receive an input in response to a tilting operation of a control stick 50. In the description of the embodiment, a rotational axis that is one of rotational axes in a tilting operation of the control stick 50 and parallel to an X1-X2 direction is referred to as a first rotational axis AX1, and a rotational axis that is orthogonal to the X1-X2 direction, the other rotational axis, and parallel to a Y1-Y2 direction is referred to as a second rotational axis AX2. For the sake of simplicity, the first rotational axis AX1 and the second rotational axis AX2 may be collectively referred to as a rotational axis AX unless otherwise specified. A direction that is orthogonal to the X1-X2 direction and the Y1-Y2 direction is referred to as a Z1-Z2 direction.

The input device 1 includes a fixing member 10, and a rotatable movable member 20 that is rotatably supported by the fixing member 10. The fixing member 10 includes a substantially box-shaped housing 11. The control stick 50 extends through an opening 11*h* provided in the housing 11 toward the Z2 side in the Z1-Z2 direction. The control stick 50 is supported by the fixing member 10 rotatably about the first rotational axis AX1 and about the second rotational axis AX2 as the centers of rotation respectively. With this structure, the control stick 50 can be tilted at an angle of 360° when viewed in the Z1-Z2 direction.

A rotation operation of the control stick 50 is transmitted to the rotatable movable member 20 of a sensing unit 25 and the rotation of the rotatable movable member 20 is detected by a magnetic sensor 30 (see FIG. 3), which will be described below. The rotatable movable member 20 includes a rotary shaft member 21 that extends along the rotational axis of the control stick 50 and a rotating disk 22 having a recessed portion 22*a* that fits with the rotary shaft member 21. The rotating disk 22 is rotatably attached to a sensing block 31. The sensing block 31 fixed to the housing 11 enables the rotary shaft member 21 and the recessed portion 22*a* of the rotating disk 22 to fit with each other.

With this structure, a rotation operation of the control stick 50 is transmitted from the rotary shaft member 21 to the rotating disk 22, thereby rotating the rotating disk 22. This rotation of the rotating disk 22 is detected by the magnetic sensor 30 provided in the sensing block 31 to detect a tilting angle of the control stick 50.

In this embodiment, the rotational axis of the control stick 50 comprises two axes, that is, the first rotational axis AX1 and the second rotational axis AX2, and the rotatable movable member 20 comprises a first rotatable movable member 20A that detects rotation about the first rotational axis AX1 and a second rotatable movable member 20B that detects rotation about the second rotational axis AX2. The first rotatable movable member 20A is attached to a side surface of the housing 11 that is orthogonal to the first rotational axis AX1 and the second rotatable movable member 20B is attached to another side surface of the housing 11 that is orthogonal to the second rotational axis AX2. For the sake of simplicity, the first rotatable movable member 20A and the second rotatable movable member 20B may be collectively referred to as a rotatable movable member 20 unless otherwise specified.

Sensing Unit

Figure 3:
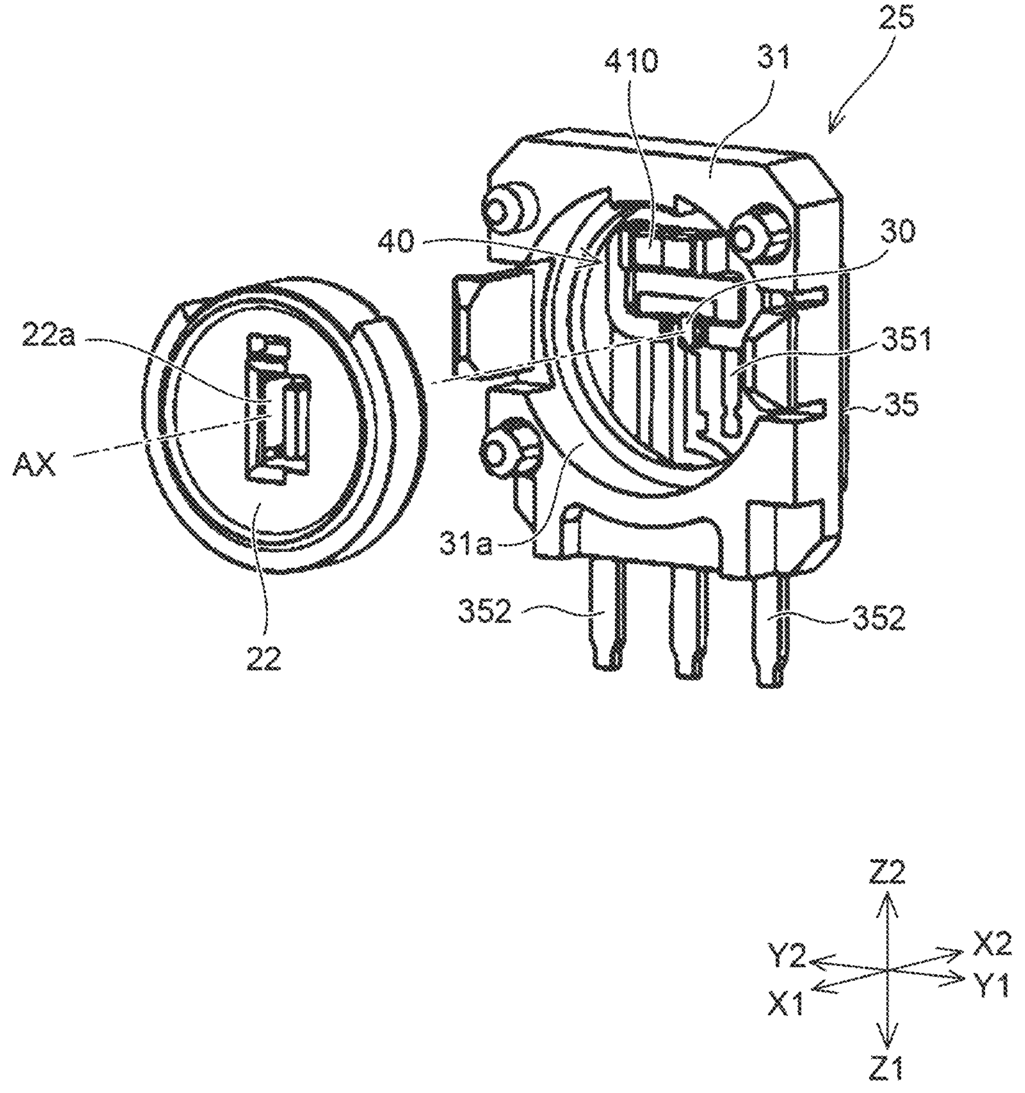
FIG. 3 is a partly exploded perspective view illustrating a structure of a sensing unit.

FIG. 3 is a partly exploded perspective view illustrating a structure of a sensing unit. The sensing unit 25 is an assembly including the sensing block 31, the rotatable movable member 20, the rotating disk 22, and a sensor substrate 35. The sensing block 31 has a cylindrical recessed portion 31*a* at a center for the rotating disk 22 to be rotatably inserted into. The rotating disk 22 is slidably and rotatably supported in a state in which the rotating disk 22 is inserted in the cylindrical recessed portion 31*a*. The sensor substrate 35 is attached to a side of the sensing block 31 opposite to the insertion side of the rotating disk 22. The magnetic sensor 30 is mounted on the sensor substrate 35.

The magnetic sensor 30 is a sensor that detects changes in the direction of a magnetic field. The magnetic sensor 30 is mounted on the sensor substrate 35 on the extension of the center of rotation (rotational axis AX) of the rotating disk 22. An annular magnetic member 40 is disposed in the vicinity of the magnetic sensor 30. The annular magnetic member 40 is attached on the rotating disk 22 side and rotates about the rotational axis together with the rotating disk 22. For example, in the first rotatable movable member 20A illustrated in FIG. 2, the magnetic sensor 30 is disposed on the extension of the first rotational axis AX1, and the annular magnetic member 40 is disposed so as to be rotatable about the first rotational axis AX1. In the second rotatable movable member 20B illustrated in FIG. 2, for example, the magnetic sensor 30 is disposed on the extension of the second rotational axis AX2, and the annular magnetic member 40 is disposed so as to be rotatable about the second rotational axis AX2.

As described above, the magnetic sensor 30 is attached to the sensing block 31 and the rotating disk 22 is rotatably supported by the sensing block 31. Accordingly, by attaching the sensing block 31 to the housing 11 (see FIG. 2), the magnetic sensor 30 and the rotating disk 22 can be assembled in a space-saving manner.

Sensor Substrate

Figure 4:
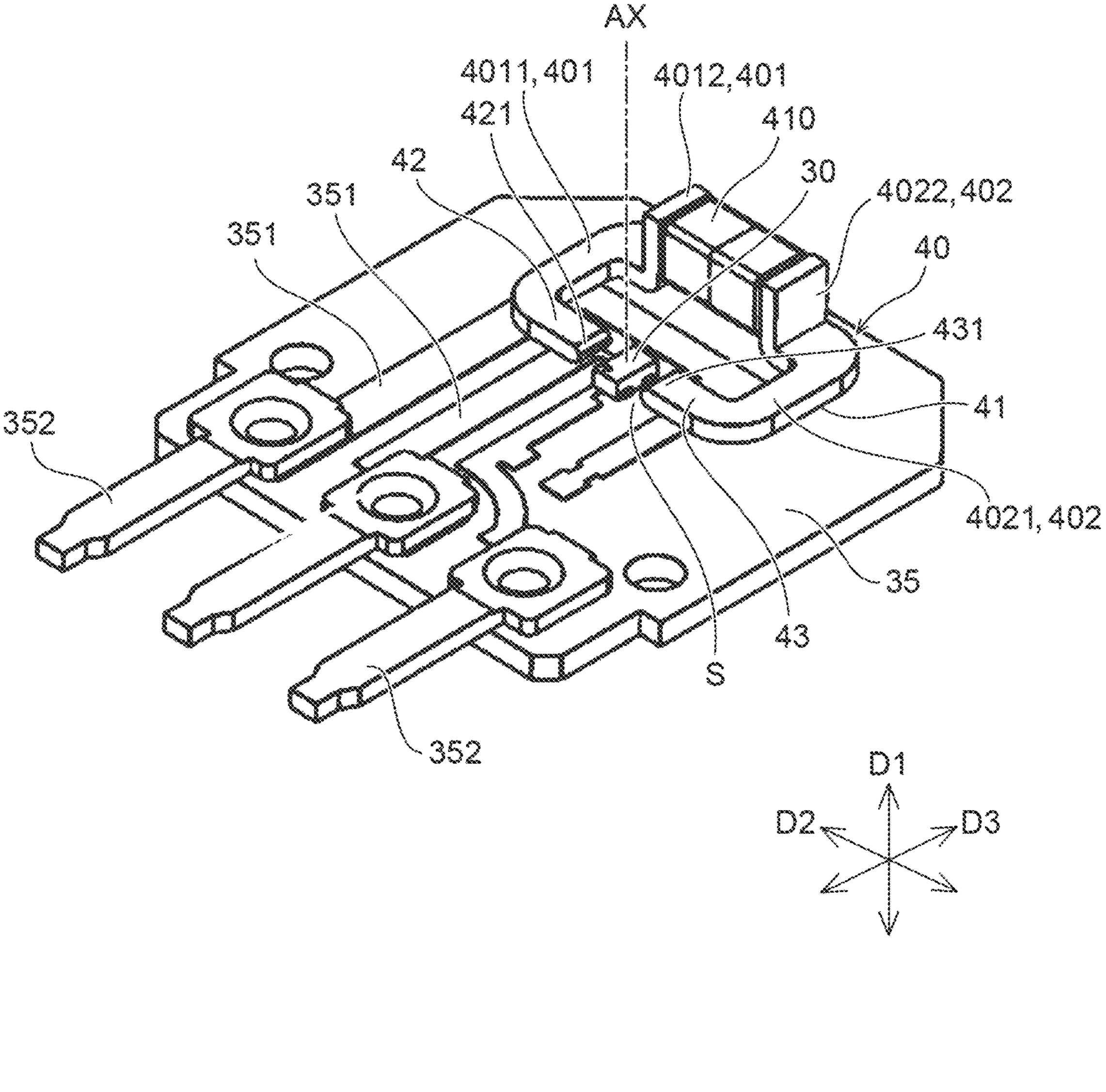
FIG. 4 is a perspective view illustrating a structure of a sensor substrate.

FIG. 4 is a perspective view illustrating a structure of a sensor substrate. For the sake of simplicity, FIG. 4 illustrates the annular magnetic member 40 together with the sensor substrate 35. The sensor substrate 35 is a substrate on which the magnetic sensor 30 is mounted. On the sensor substrate 35, a pattern 351 that is in an electrically conductive relationship with the mounted magnetic sensor 30 and a terminal 352 that is in an electrically conductive relationship with the pattern 351 are provided. A signal detected by the magnetic sensor 30 is sent to the outside from the terminal 352. This sensor substrate 35 is attached to the sensing block 31 illustrated in FIG. 3, and the rotating disk 22 in which the annular magnetic member 40 is incorporated is inserted into the cylindrical recessed portion 31*a* from the opposite side of the sensor substrate 35, resulting in the positional relationship between the sensor substrate 35 and the annular magnetic member 40 as illustrated in FIG. 4.

Annular Magnetic Member

As illustrated in FIG. 4, the annular magnetic member 40 includes a body 41, a first extended portion 42, and a second extended portion 43. When viewed in the rotational axis AX direction, the annular magnetic member 40 has a substantially C-shape having the body 41 as a main portion including a permanent magnet 410. The first extended portion 42 is extended from one end of the body 41 and the second extended portion 43 is extended from the other end of the body 41. A first tip portion 421 that is a tip portion of the first extended portion 42 and a second tip portion 431 that is a tip portion of the second extended portion 43 are disposed to face each other in a second direction D2 that is orthogonal to a first direction D1 that corresponds to the direction of the rotational axis AX passing through the magnetic sensor 30. The body 41 extends in a third direction D3 that is orthogonal to the first direction D1 and the second direction D2. With this structure, the body 41 extends in the direction different from the rotational axis direction of the rotatable movable member 20, thereby reducing the size of the device in the rotational axis direction.

Between the first tip portion 421 and the second tip portion 431, a divided space S is formed. The magnetic sensor 30 is disposed in the divided space S. A magnetic field is generated from the first tip portion 421 toward the second tip portion 431 in the divided space S and the magnetic sensor 30 disposed in the divided space S detects the direction of the magnetic field.

More specifically, the annular magnetic member 40 includes a first yoke 401 having the first tip portion 421 and a first base portion connected to one pole of the permanent magnet 410 and a second yoke 402 having the second tip portion 431 and a second base portion connected to the other pole of the permanent magnet 410.

The first yoke 401 has a first middle portion 4011 that extends along a surface (surface orthogonal to the rotational axis AX) parallel to the second direction D2 and the third direction D3 and a first bent piece 4012 that is bent from the first middle portion 4011 in the first direction D1 toward the control stick 50 (see FIG. 2). The second yoke 402 has a second middle portion 4021 that extends along a surface (surface orthogonal to the rotational axis AX) parallel to the second direction D2 and the third direction D3 and a second bent piece 4022 that is bent from the second middle portion 4021 in the first direction D1 toward the control stick 50 (see FIG. 2).

One pole of the permanent magnet 410 is connected to the first bent piece 4012 that is the first base, and the other pole of the permanent magnet 410 is connected to the second bent piece 4022 that is the second base, and thereby the first bent piece 4012 and the second bent piece 4022 are disposed at the positions closer to the control stick 50 (see FIG. 2) than the first middle portion 4011 and the second middle portion 4021 are. With this structure, the size of the device in the rotational axis direction can be further reduced.

Rotating Disk

Figure 5:
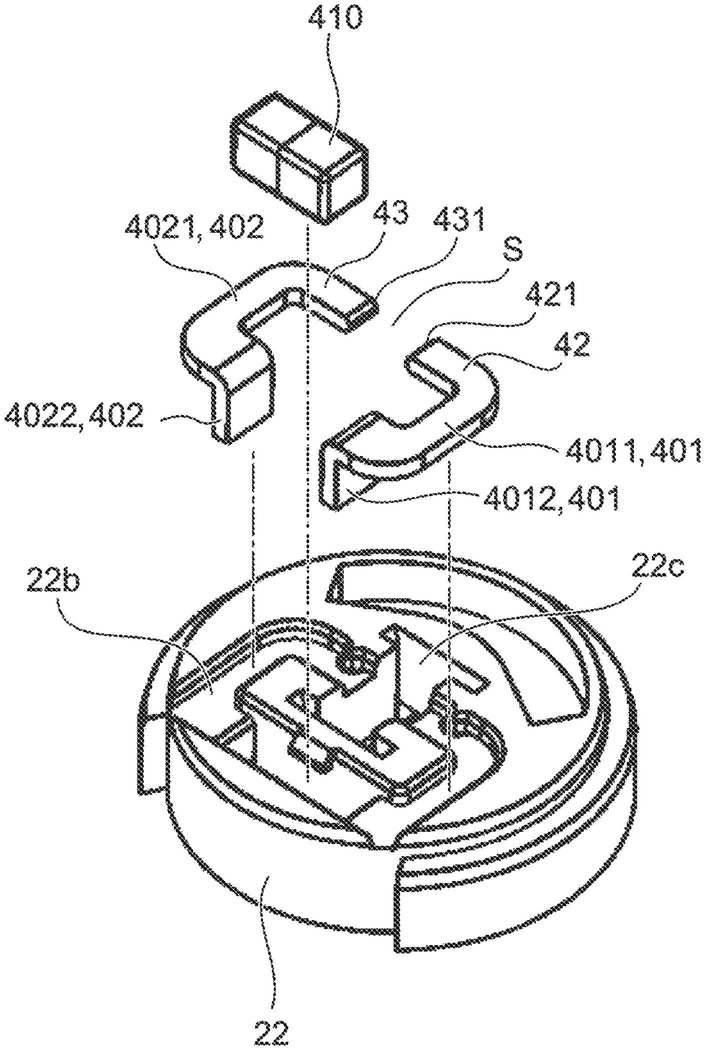
FIG. 5 is an exploded perspective view illustrating a structure of a rotating disk.

FIG. 5 is an exploded perspective view illustrating a structure of a rotating disk. FIG. 5 is an exploded perspective view illustrating the rotating disk 22 viewed from the side of the sensing block 31 illustrated in FIG. 3. The rotating disk 22 is a nonmagnetic cylindrical component. The rotating disk 22 has an annular recessed portion 22*b*. The annular magnetic member 40 is fit into the annular recessed portion 22*b*. A hook or a crush rib may be provided at an edge of the annular recessed portion 22*b*. With this structure, the permanent magnet 410, the first yoke 401, and the second yoke 402 fit into the annular recessed portion 22*b* can be readily fixed.

The annular magnetic member 40 fit into the annular recessed portion 22*b* in the rotating disk 22 enables the first bent piece 4012 and the second bent piece 4022 (see FIG. 4) of the annular magnetic member 40 to be embedded inside the rotating disk 22, thereby preventing the first bent piece 4012 and the second bent piece 4022 from protruding to the outside of the rotating disk 22.

The rotating disk 22 has a space forming portion 22*c* at a central portion. The space forming portion 22*c* is provided on a side opposite to the recessed portion 22*a* (see FIG. 2) that fits with the rotary shaft member 21 (see FIG. 2) in the rotating disk 22. The annular magnetic member 40 fit into the annular recessed portion 22*b* in the rotating disk 22 enables the divided space S in the annular magnetic member 40 to be located at the space forming portion 22*c*. When the rotating disk 22 is inserted into the cylindrical recessed portion 31*a* (see FIG. 3) in the sensing block 31 (see FIG. 3), the magnetic sensor 30 (see FIG. 3) is disposed in the space forming portion 22*c*, that is, the divided space S. The magnetic sensor 30 disposed in the divided space S enables a reduced height difference between the first extended portion 42 and the second extended portion 43 in the annular magnetic member 40 and the magnetic sensor 30 in the direction of the rotational axis AX. Accordingly, the size of the device in the rotational axis AX direction can be reduced.

Figure 6:
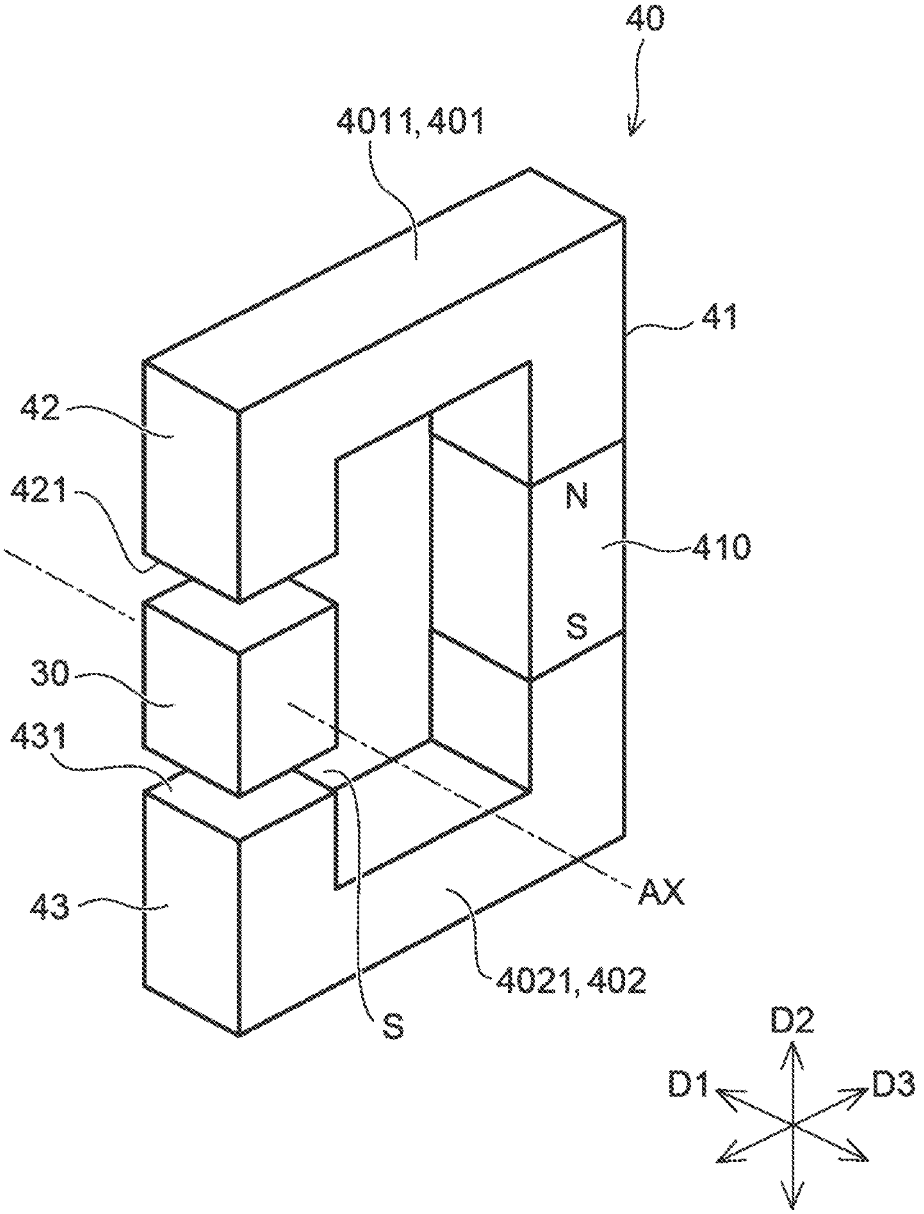
FIG. 6 is a schematic view illustrating a structure of an annular magnetic member.

FIG. 6 is a schematic view illustrating a structure of an annular magnetic member. FIG. 6 illustrates a positional relationship between the annular magnetic member 40 and the magnetic sensor 30. The annular magnetic member 40 is disposed in the vicinity of the rotational axis AX passing through the magnetic sensor 30 disposed in the divided space S. The magnetic sensor 30 is mounted on the sensor substrate 35 (see FIG. 4) and is fixed (does not rotate). The annular magnetic member 40 rotates about the magnetic sensor 30 as the rotating disk 22 rotates.

The body 41 of the annular magnetic member 40 extends in a direction different from the direction of the rotational axis AX. In this embodiment, the body 41 extends in the third direction D3, which is orthogonal to the first direction D1 that corresponds to the rotational axis AX, and rotates and moves in the plane parallel to the second direction D2 and the third direction D3. With this structure, the size of the annular magnetic member 40 in the direction of the rotational axis AX can be reduced.

Figure 7A:
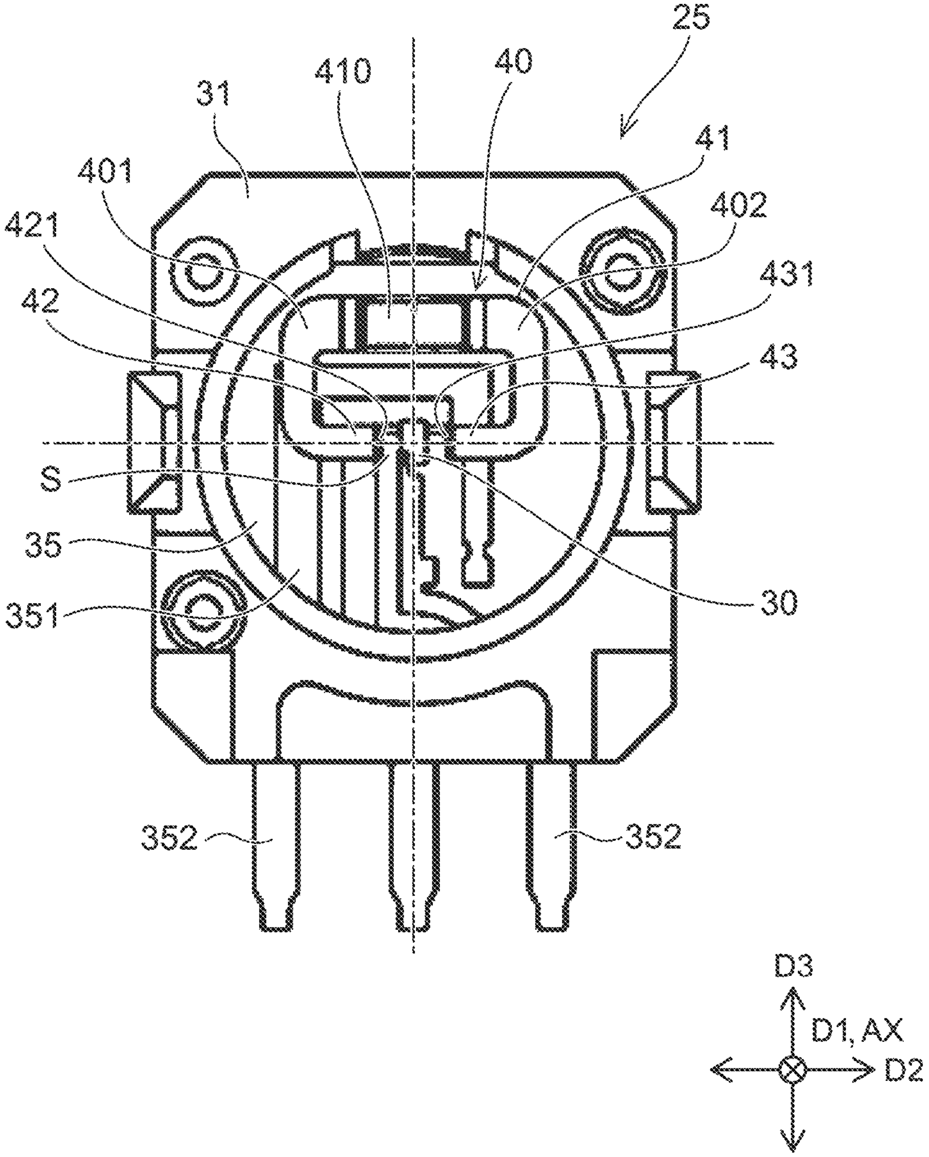
FIG. 7A is schematic view illustrating a rotating operation in a sensing unit.
Figure 7B:
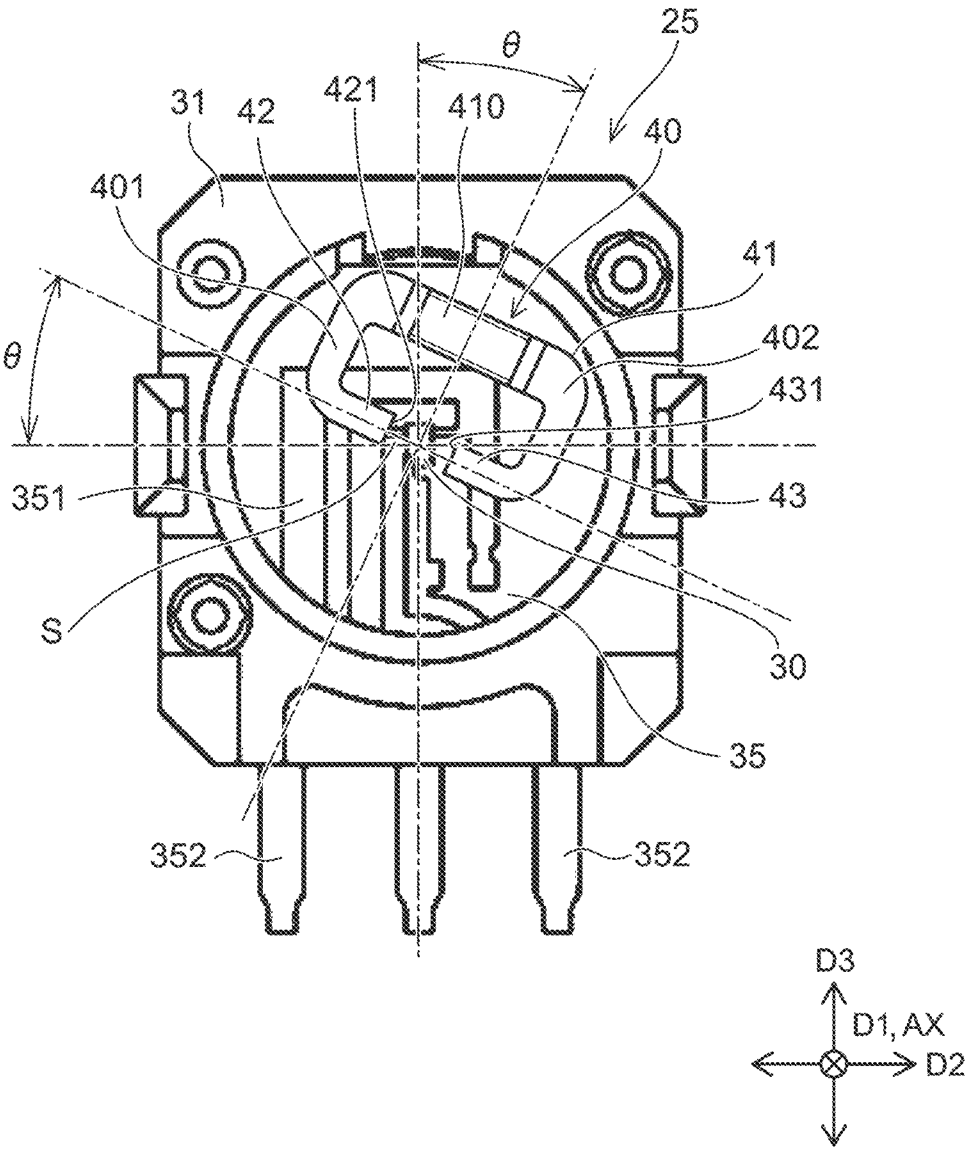
FIG. 7B is a schematic view illustrating a rotating operation in a sensing unit.

FIG. 7A and FIG. 7B are schematic views illustrating a rotating operation in a sensing unit. FIG. 7A illustrates a position of the annular magnetic member 40 in the sensing block 31 in a state in which the control stick 50 (see FIG. 2) is not tilted. FIG. 7B illustrates a position of the annular magnetic member 40 in the sensing block 31 in a state in which the control stick 50 is tilted (at a tilting angle θ) about the rotational axis AX as the center of rotation.

When the control stick 50 is tilted, the annular magnetic member 40 rotates by the amount corresponding to the tilting angle θ of the control stick 50 about the rotational axis AX with the center of the divided space S as the center of rotation. The body 41 of the annular magnetic member 40 extends along the surface (in the second direction D2 and the surface along the second direction D2) orthogonal to the rotational axis AX (the first direction D1), and thus the annular magnetic member 40 rotates along the surface orthogonal to the rotational axis AX.

The rotational angle of the annular magnetic member 40 changes depending on the tilting angle θ of the control stick 50. With this structure, the direction of a magnetic field emitted from one of the first tip portion 421 of the first extended portion 42 and the second tip portion 431 of the second extended portion 43 through the divided space S of the annular magnetic member 40 toward the other tip portion changes. This change in the direction of the magnetic field is detected by the magnetic sensor 30 disposed in the divided space S. Based on the change in the direction of the magnetic field detected by the magnetic sensor 30, the tilting angle θ of the control stick 50 is calculated.

Modification

Figure 8A:
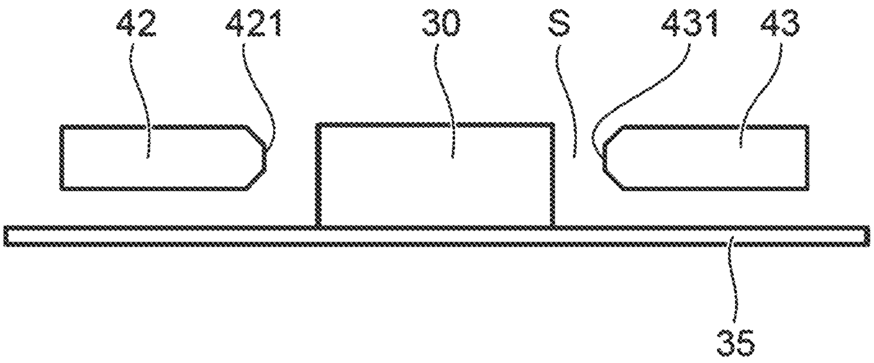
FIG. 8A is a schematic view illustrating a modification.
Figure 8B:
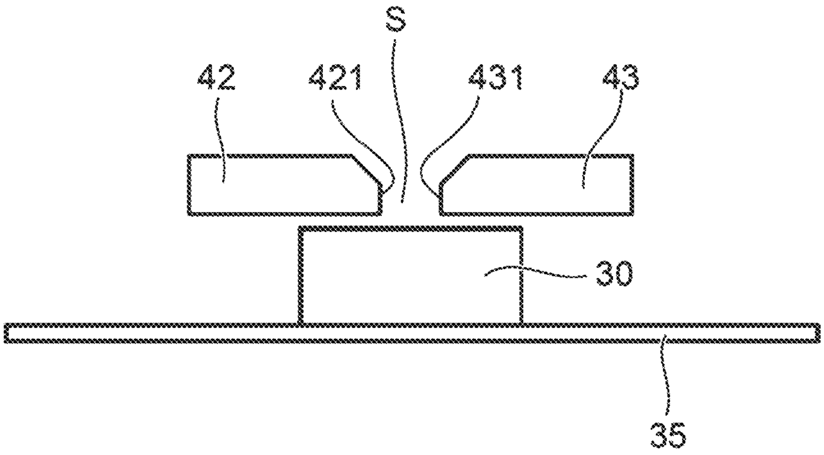
FIG. 8B is a schematic view illustrating a modification.

FIG. 8A and FIG. 8B are schematic views illustrating a modification. FIG. 8A and FIG. 8B illustrate a positional relationship among the first extended portion 42, the second extended portion 43, and the magnetic sensor 30. In the example in FIG. 8A, the magnetic sensor 30 is disposed between the first tip portion 421 of the first extended portion 42 and the second tip portion 431 of the second extended portion 43, that is, in the divided space S. In this case, a magnetic field going from one of the first tip portion 421 and the second tip portion 431 toward the other portion passes through the magnetic sensor 30.

In another example in FIG. 8B, the magnetic sensor 30 is not disposed between the first tip portion 421 of the first extended portion 42 and the second tip portion 431 of the second extended portion 43, that is, the magnetic sensor 30 is not disposed in the divided space S and disposed in the vicinity of the divided space S. In this case, the distance between the first tip portion 421 and the second tip portion 431 can be shortened, increasing the magnetic flux density in the divided space S. The magnetic sensor 30 detects the direction of a magnetic field in the vicinity of the divided space S.

According to the embodiment, the size of the input device 1 that includes the rotatable movable member 20 configured to change the direction of a magnetic field disposed in the vicinity of the magnetic sensor 30 can be reduced.

Although the embodiment has been described above, the present invention is not limited to this embodiment. For example, in this embodiment, the control stick 50 is rotatably supported about each of the first rotational axis AX1 and the second rotational axis AX2; however, the control stick 50 may be rotatably supported about one of the rotational axes. It is to be understood that any component may be added, any of the above-described components may be omitted, or any of the above-described designs may be modified, or any features of the structures according to the embodiment may be combined appropriately by a person skilled in the art without departing from the scope of the invention, and such modifications are included within the scope of the invention.

What is claimed is:

1. An input device comprising:
- a fixing member;
- a rotatable movable member supported by the fixing member rotatably about a first direction as a center of rotation;
- an annular magnetic member attached to the rotatable movable member, the annular magnetic member including:
  - a body;
  - a first extended portion extended from one end of the body;
  - a second extended portion extended from the other end of the body, wherein a divided space is formed between a first tip portion of the first extended portion and a second tip portion of the second extended portion facing along a second direction orthogonal to the first direction, and the annular magnetic member is configured to generate a magnetic field going from the first extended portion toward the second extended portion;
  - a permanent magnet;
  - a first yoke having the first tip portion and a first base portion connected to one pole of the permanent magnet; and
  - a second yoke having the second tip portion and a second base portion connected to the other pole of the permanent magnet; and
- a magnetic sensor attached to the fixing member, the magnetic sensor being configured to detect a direction of the magnetic field emitted from one of the first extended portion and the second extended portion toward the other of the first extended portion and the second extended portion to detect the rotation of the rotatable movable member,
- wherein the body extends in a third direction orthogonal to the first direction and the second direction,
- the first yoke has a first middle portion extending along a surface parallel to the second direction and the third direction and a first bent piece bent from the first middle portion along the first direction,
- the second yoke has a second middle portion extending along the surface parallel to the second direction and the third direction and a second bent piece bent from the second middle portion along the first direction, and
- the one pole of the permanent magnet is connected to the first bent piece and the other pole is connected to the second bent piece.

2. The input device according to claim 1, further comprising:
- a control stick supported by the fixing member together with the rotatable movable member rotatably about the first direction as the center of rotation, wherein
- the annular magnetic member is disposed at a position away from the control stick in the first direction, the first bent piece is bent from the first middle portion along the first direction toward the control stick, the second bent piece is bent from the second middle portion along the first direction toward the control stick, and the first bent piece and the second bent piece are disposed at positions closer to the control stick than the first middle portion and the second middle portion.

3. The input device according to claim 1, wherein the rotatable movable member includes a rotary shaft member and a rotating disk configured to rotate in conjunction with the rotary shaft member, the fixing member includes:

a housing rotatably supporting the rotary shaft member; and a sensing block attached to the housing and rotatably supporting the rotating disk, and the magnetic sensor is attached to the sensing block, and the rotating disk is a cylindrical component to which the annular magnetic member is attached and rotatably inserted into a cylindrical recessed portion formed in the sensing block.

* * * * *